United States Patent [19]
Martel

[11] 3,876,491
[45] Apr. 8, 1975

[54] SYNTHETIC SUEDE

[75] Inventor: George E. Martel, Westfield, Mass.

[73] Assignee: Texon, Inc., South Hadley Falls, Mass.

[22] Filed: Feb. 8, 1973

[21] Appl. No.: 330,735

[52] U.S. Cl. ............... 161/62; 156/78; 156/281; 156/344; 161/164; 161/DIG. 2; 264/284
[51] Int. Cl. ............................................ B32b 3/10
[58] Field of Search .......... 161/62, 64, DIG. 2, 164; 264/284; 156/77, 78, 79, 281, 344

[56] References Cited
UNITED STATES PATENTS

| | | | |
|---|---|---|---|
| 3,284,274 | 11/1966 | Hulslander et al. | 161/159 |
| 3,399,425 | 9/1968 | Lemelson | 161/62 UX |
| 3,443,007 | 5/1969 | Hardy | 156/78 |
| 3,524,791 | 8/1970 | Bethman et al. | 161/DIG. 2 |
| 3,600,260 | 8/1971 | Watanabe | 161/62 |
| 3,660,218 | 5/1972 | Shepherd et al. | 161/164 |
| 3,696,183 | 10/1972 | Steel et al. | 161/62 |
| 3,719,549 | 3/1973 | Mittman | 161/DIG. 2 |

Primary Examiner—William J. Van Balen

[57] ABSTRACT

A synthetic suede product formed of a thermoplastic foam adhered to a fibrous substrate, wherein the foam has the surface characteristics of natural suede. The synthetic suede product is formed by removing a surface layer of the foam so as to expose the pore structure thereof.

3 Claims, 6 Drawing Figures

SYNTHETIC SUEDE

BACKGROUND

The present invention relates to a product having a suede-like finish and a process for producing the same. More particularly, the present invention relates to a thermoplastic foam material adhered to a substrate and then contacted with a heated melt roll to remove a surface layer of the thermoplastic so as to produce a suede-like surface on the thermoplastic foam.

In recent years many methods have been developed for the production of synthetic suede materials from thermoplastics. In general, most of these methods fall into one of four major catagories:

1. processes employing negative mold formation of fibers on the surface of a plastic material as exemplified in U.S. Pat. No. 3,141,051;
2. processes employing pressure molding or embossing techniques;
3. processes employing brushing or roughening techniques; and
4. processes wherein flocking techniques are employed. While all these various methods are capable of producing suede-like materials of varying quality, all appear to require specialized equipment and/or rather expensive work-ups of basic materials.

It is an object of the present invention to provide a synthetic suede product having surface characteristics similar to those of natural suede.

It is another object of the present invention to provide a synthetic suede product formed from a thermoplastic material, such as polyvinyl chloride plastisol which is strain resistant and durable.

It is another object of this invention to provide a method of producing a continuous sheet of synthetic suede material.

It is a further object of the present invention to provide a method for producing a synthetic suede product that may be easily and swiftly adjusted so as to produce different suede-like surface textures.

The above and other objects and advantages of the present invention will become readily apparent from the following description and the accompanying drawings wherein.

Figure 2:
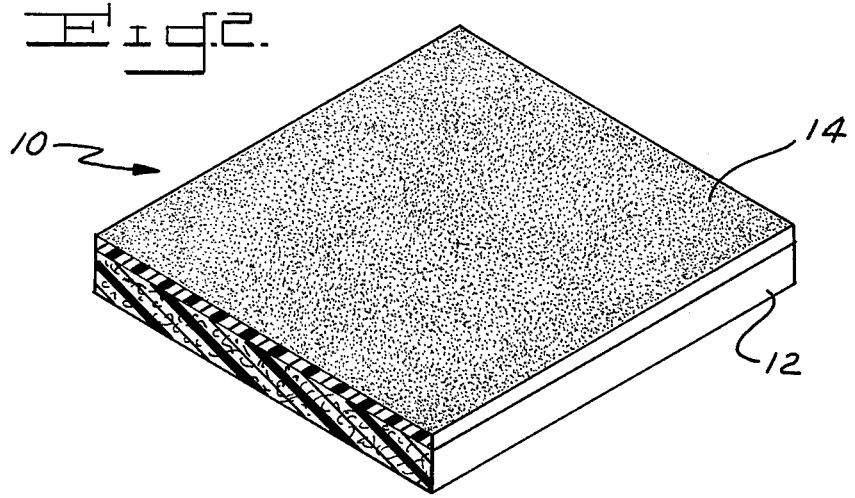
FIG. 2 is a fragmentary view of the synthetic suede product of the present invention.

As best seen in FIG. 2, the synthetic suede product 10 of the present invention is comprised of two basic parts—a backing or substrate 12 and a coating 14.

The backing or substrate 12 can be any of a number of materials, primarily of a fibrous nature, which are capable of acting as a carrier for the coating. Such materials include cloth, scrim, resin or elastomer impregnated cellulose and the like. In general, the backing need only be capable of retaining the coating thereon when it is applied thereto and also be capable of retaining its physical properties at coating and sueding temperatures, i.e., 360°–450°F. and 340°–392° F., respectively.

The coating 14 used in the product of this invention is a foamable thermoplastic resin in plastisol or other suitable form. While a variety of thermoplastic resins, such as polyvinyl chloride, polyethylene and polyurethane, are contemplated for use in the present invention, polyvinyl chloride is preferred.

The preliminary steps in the manufacture of the synthetic suede product of the present invention involve commercially known techniques of applying a thermoplastic foam resin to a substrate. For example, a polyvinyl chloride plastisol is coated on a substrate, such as a resin and/or elastomer impregnated cellulose material, by the use of a reverse roll coater. The wet thickness of the applied coating of PVC plastisol is from about 3 to 15 mils. Subsequent to the coating, the product is passed through an oven maintained at about the temperature of activation of the blowing mechanism in the coating. In the case of PVC foam the blowing mechanism is a chemical blowing agent, such as many of the commercially available azo-compounds, i.e., azodicarbonamides and azobis. Such blowing agents have a temperature of activation of from about 360°–450° F.

The amount of chemical blowing agent used in the thermoplastic resin is such that blow ratios, i.e., thickness of coating before blowing to thickness after blowing, of from about 2:1 to 7:1 are obtained. Preferably, 3:1 to 4:1 blow ratios are employed. The control exercised over the blow ratio controls the density of the foam produced and thus, as is explained below, the surface characteristics of the final product. Densities of from 6 lbs/ft$^3$ to 30 lbs/ft$^3$ are normally employed with best results obtained at 14 lbs/ft$^3$ to 18 lbs/ft$^3$.

Other suitable compounding additives for foamable thermoplastic may also be employed. Such additives include, plasticizers, stabilizers, dyes, pigments, fugicides, germicides and the like.

The intermediate foamed product produced by the method described above has a characteristically smooth and reflecting surface. Such a foam product is continuously produced in roll form and may be immediately converted to the suede-like product of the present invention or stored in rolls and converted at a later date.

As mentioned above, all of the steps in the production of the foam produced described above are well known in the art.

Figure 1:
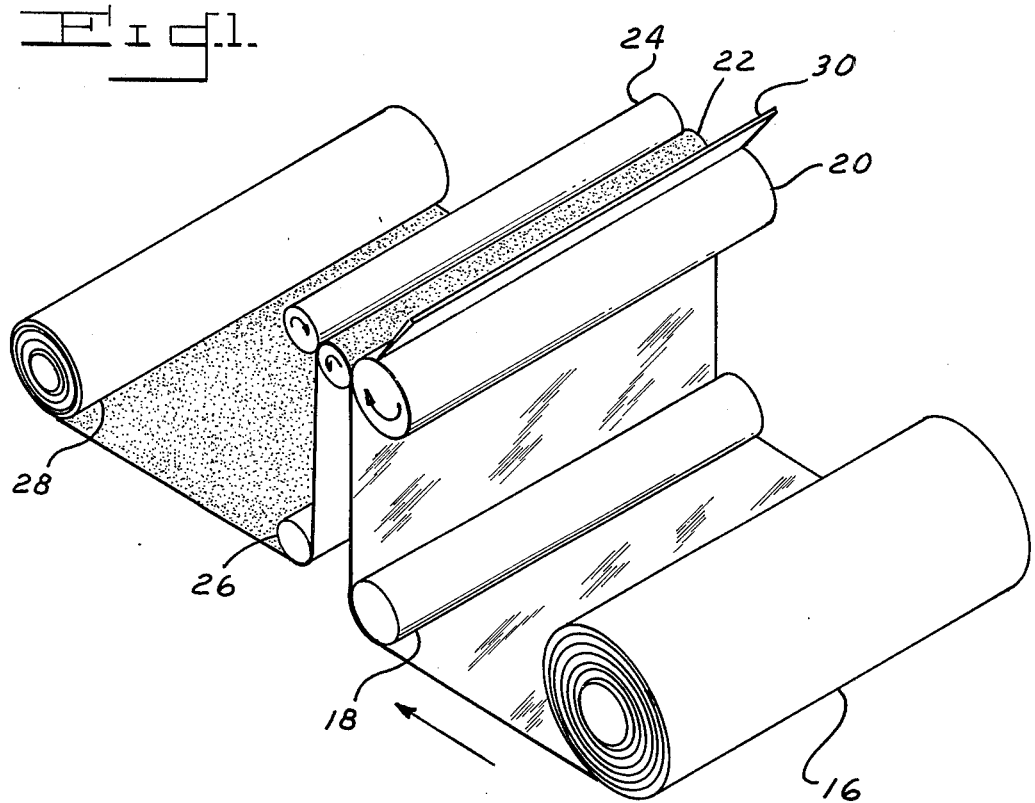
FIG. 1 is a schematic diagram of the apparatus used in producing the synthetic suede of the present invention.

With reference now to FIG. 1, a schematic diagram of the actual sueding treatment of the present invention is presented. As shown, the foam product described above, i.e., the intermediate foam product, is fed from feed roll 16, with the foam coating disposed on the inside of the roll, about a pre-heat roll 18 and into a nip formed by a sueding roll 20 and a pressure roll 22. From this point the suede product is passed between the nip of pressure roll 22 and nip roll 24, about roll 26 and finally onto takeup roll 28.

In the described apparatus, the actual sueding of the surface of the thermoplastic foam is brought about by pressurized contact of the surface of the thermoplastic foam with the heated sueding roll 20. To give the suede-like appearance to the thermoplastic foam, it is necessary to maintain the sueding roll at a temperature which approximates the melt temperature of the thermoplastic foam being treated. A normal temperature range would be approximately 340° to 400° F. In the case of PVC foam the temperature is about 374° F.

The sueding roll 20, which has a hard smooth surface, performs the sueding effect by removal of a surface layer of the foam approximately 3 to 6 mils thick. It is postulated that when the resin foam comes into contact with the smooth sueding roll at the appropriate melt temperature of the foam, the outer surface of the foam is softened to a point where it is in fact picked from the main body of the resin foam. The amount of surface layer so picked off by the sueding roll 20 is removed from the smooth surface thereof by the action of a doctor blade 30.

Once the surface layer of the resin foam has been removed, the pore structure of the foam that remains is exposed and this pore structure per se gives the product its textured suede characteristic. One will note this effect by referring to FIGS. 3, 4, 5 and 6.

The following examples are presented to further illustrate the process of the present invention and the means whereby the surface texture of the synthetic suede product is controlled.

EXAMPLE I

A polyvinyl chloride plastisol having enough chemical blowing agent therein to provide a 4:1 blowing ratio was coated on an elastomer impregnated cellulosic substrate having a thickness of 0.045 inches. The wet thickness of the coating was approximately 0.025 inches. The coated substrate was passed through an oven at a temperature of about 400° F. in order to foam the PVC plastisol. The product, which had a smooth outer surface, was cooled and found to have a thickness of about 0.145 to 0.150 inches.

At this point the product was passed to the sueding apparatus under the following conditions:

| | |
|---|---|
| Pre-heat roll temperature | 140° F. |
| Sueding roll temperature | 374° F. |
| Pressure roll pressure | 15 lb/in² |
| Feed speed | 15 yds/min |

Figure 3:
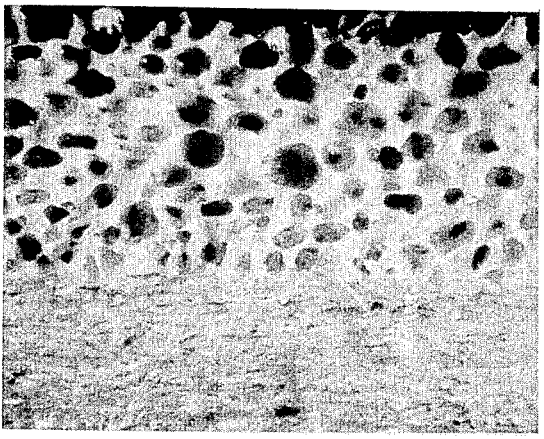
FIG. 3 is a photomicrograph of a cross section of synthetic suede product, made by the method of the present invention, magnified 30 times.
Figure 4:
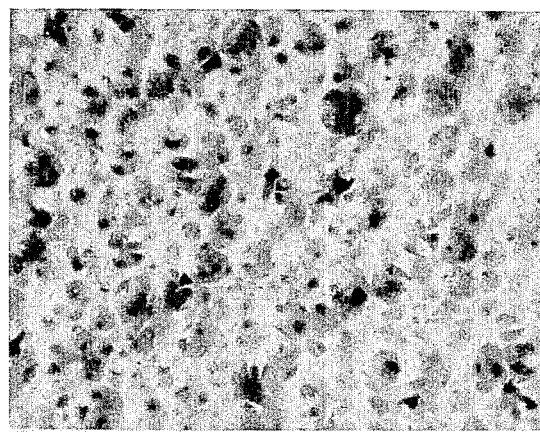
FIG. 4 is a photomicrograph of the surface of the synthetic suede product of FIG. 3, magnified 30 times.

The synthetic suede product formed had a calculated thickness loss of about 5 mils. FIGS. 3 and 4, respectively, are photomicrographs of the cross section and top surface of the synthetic suede product formed.

EXAMPLE II

The same coated substrate as employed in Example I was used in this example, except that the foaming oven was maintained at a temperature of about 425° to 430° F., which caused an "overblow" of the foam. This product was treated on the sueding apparatus under exactly the same conditions as described above in Example I and the resulting synthetic suede product formed had a calculated thickness loss of approximately 5 mils.

Figure 5:
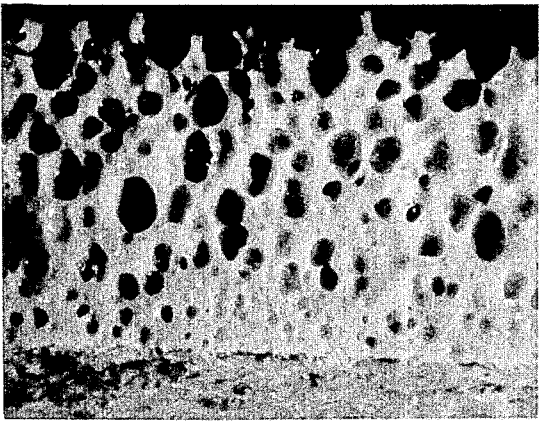
FIG. 5 is a photomicrograph of a cross section of another synthetic suede product, made by the method of the present invention, magnified 30 times.
Figure 6:
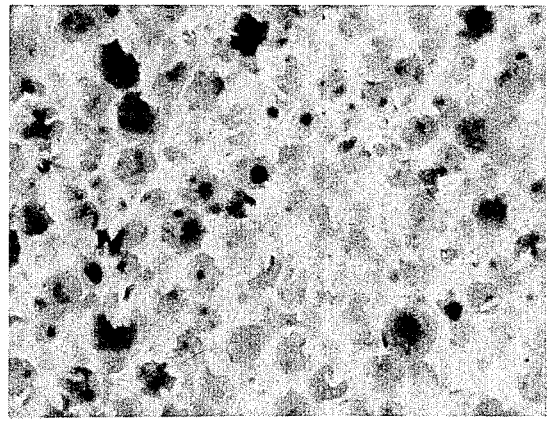
FIG. 6 is a photomicrograph of the surface of the synthetic suede product of FIG. 5, magnified 30 times.

As shown in FIGS. 5 and 6, the "overblow" condition of the intermediate foam resulted in a larger and more open pore structure which provided a rougher suede surface characteristic than that exhibited by the synthetic suede product of Example I.

Additional experimentation has shown that the surface characteristic of the synthetic suede is not appreciably affected by feed speed or nip pressure. Rather, it is primarily dependent upon the pore structure of the foam to be sueded, which is controlled by blow ratios and general foam blowing conditions. For example, experimentation has shown that a highly blown foam, i.e., a foam blow ratio of 6:1 to 7:1, exhibits a fine pore structure and consequently upon treatment according to this invention one is provided with a very soft suede-like surface effect. On the other hand, when a blow ratio of about 2:1 is employed, the resulting synthetic suede is much coarser and rougher.

What is claimed is:

1. In the method of producing synthetic suede having the appearance of natural suede by coating a substrate with a foamable thermoplastic resin and heating said resin to generate a foam having a generally smooth and reflective outer surface layer, the improvement which comprises thereafter removing said outer surface layer by compressively contacting the same with a smooth surface heated to approximately the melt temperature of the thermoplastic resin to soften the outer surface portion of the foam and removing said outer surface layer by disengaging the contacting heated surface thereby exposing the underlying pore structure of the foam generated during foam formation.

2. In the method of producing a synthetic suede as set forth in claim 1 wherein said heated surface is in the form of a heated roll against which the outer surface of said foam is contacted.

3. Synthetic suede produced by the method recited in claim 1.

* * * * *